United States Patent
Kishida et al.

(10) Patent No.: US 9,371,801 B2
(45) Date of Patent: Jun. 21, 2016

(54) IGNITION DEVICE FOR TWO-PULSE ROCKET MOTOR WITH THERMAL BARRIER MEMBRANE

(71) Applicants: ASAHI KASEI CHEMICALS CORPORATION, Tokyo (JP); MITSUBISHI HEAVY INDUSTRIES, LTD., Tokyo (JP)

(72) Inventors: Tomohiro Kishida, Tokyo (JP); Yukihiro Tsunezumi, Tokyo (JP); Chiyako Mihara, Tokyo (JP); Tasuku Suzuki, Tokyo (JP); Katsunori Ieki, Tokyo (JP)

(73) Assignees: ASAHI KASEI KABUSHIKI KAISHA, Tokyo (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 448 days.

(21) Appl. No.: 13/911,449

(22) Filed: Jun. 6, 2013

(65) Prior Publication Data

US 2013/0327016 A1    Dec. 12, 2013

(30) Foreign Application Priority Data

Jun. 12, 2012  (JP) .................. 2012-132865

(51) Int. Cl.
*F02K 9/95*  (2006.01)
(52) U.S. Cl.
CPC ........................ *F02K 9/95* (2013.01)
(58) Field of Classification Search
CPC ............... F02K 9/08; F02K 9/12; F02K 9/28; F02K 9/95
See application file for complete search history.

(56) References Cited

U.S. PATENT DOCUMENTS

| | | | | |
|---|---|---|---|---|
| 5,206,989 A | * | 5/1993 | Smith | F02K 9/28 29/447 |
| 5,410,966 A | * | 5/1995 | Dorffler | F42B 3/26 102/202 |
| 5,600,946 A | * | 2/1997 | Dombrowski | F02K 9/28 60/253 |
| 7,281,367 B2 | * | 10/2007 | Rohrbaugh | F02K 9/08 60/204 |
| 7,762,195 B2 | * | 7/2010 | Friedlander, III | F02K 9/38 102/380 |
| 8,397,486 B2 | * | 3/2013 | Mihara | F02K 9/12 102/287 |
| 2010/0218481 A1 | | 9/2010 | Mihara et al. | |

FOREIGN PATENT DOCUMENTS

| | | |
|---|---|---|
| JP | 63-55351 | 3/1988 |
| JP | 3231778 | 9/2001 |
| JP | 2006-266198 | 10/2006 |

(Continued)

*Primary Examiner* — Arun Goyal
(74) *Attorney, Agent, or Firm* — Greenblum & Bernstein, P.L.C.

(57) ABSTRACT

In a two-pulse rocket motor provided with a pressure vessel, a first propellant placed within the pressure vessel that burns during a first pulse stage, a second propellant placed within the pressure vessel that burns during a second pulse stage following the first pulse stage, and a barrier membrane placed so as to cover the entire initial burning surface of the second propellant, wherein the barrier membrane is provided with an inner barrier membrane that covers the inner peripheral surface of the second propellant and an aft barrier membrane that covers the rear surface of the second propellant, and an end portion where the aft barrier membrane and the inner barrier membrane meet is joined over the entire circumference thereof. The ignition device includes an energy supply unit, an energy transfer unit connected at one end to the energy supply unit, and an ignition unit.

12 Claims, 3 Drawing Sheets

(56) References Cited

FOREIGN PATENT DOCUMENTS

| JP | 4179157 | 9/2008 |
| JP | 2008-280967 | 11/2008 |
| JP | 4719182 | 4/2011 |
| WO | 95/30084 | 11/1995 |

* cited by examiner

DETAIL A

IGNITION DEVICE FOR TWO-PULSE ROCKET MOTOR WITH THERMAL BARRIER MEMBRANE

TECHNICAL FIELD

The present invention relates to an ignition device for a two-pulse rocket motor.

BACKGROUND ART

The technology for employing two pulses for rocket motors adopts a system in which two propellants are placed in a single pressure vessel separated by a barrier membrane, and the second propellant is protected from heat of first propellant burning by the barrier membrane so that the second pulse is not activated (second propellant is not burned) during activation of the first pulse. The ignition device for the second pulse (second ignition device) of this two-pulse rocket motor is required to have a function that initiates second propellant combustion and simultaneously rupturing the barrier membrane. Moreover, the second ignition device is required to ensure strength of the ignition device with respect to vibrations encountered during operation of the flying object and environmental factors such as heat during combustion of the first propellant without increasing structural weight by strengthening the structure in order to prevent a decrease in acceleration performance of the flying object.

However, in the case of the two-pulse rocket motor described in Patent Document 1, for example, a duplex structure, in which is placed a first ignition device and a second ignition device composed with an annular chamber around the front outer periphery thereof, is attached to the front end (end plate) of the rocket motor, and the structure of the attached portion is large in terms of both dimensions and weight.

In addition, in the case of placing a first ignition device and second ignition device in series as in the two-pulse rocket motor described in Patent Document 2, since the ignition devices have a long, narrow cantilever structure, it is necessary to strengthen the structure in order to ensure strength of the ignition devices with respect to environmental loads such as vibrations encountered during operation, thereby making this unsuitable for long motors due to the increase in structural weight.

In addition, in the barrier membranes and barrier membrane retaining structures of the two-pulse rocket motors described in Patent Document 1 and Patent Document 2, the rupturability and retainability of the barrier membrane during activation of the second ignition device are indistinct, and in the case the barrier membrane has been ruptured at an unexpected portion, combustion of the second propellant or flow of combustion gas is inhibited by the ruptured barrier membrane, or moreover it has the possibility of the nozzle choking by the ruptured barrier membrane depending on the particular case.

Patent Document 3 proposes a two-pulse rocket motor capable of solving the technical problems described in the aforementioned Patent Document 1 and Patent Document 2. The following provides an explanation of the two-pulse rocket motor described in Patent Document 3.

FIG. 1 is a longitudinal cross-sectional view showing an example of the two-pulse rocket motor described in Patent Document 3.

As shown in FIG. 1, a second ignition device 8 is protected from heat by a barrier membrane 10 in the same manner as a second propellant 5, and does not require protection from heat as a result of being burned out after activation.

A weak portion (joint) is provided in the barrier membrane 10 by employing a structure in which it is divided into two parts. More particularly, the barrier membrane 10 that covers the second propellant 5 is composed of a circular truncated conical aft barrier membrane 10a provided on the rear surface of the second propellant 10, and a cylindrical inner barrier membrane 10b provided on the inner peripheral surface of the second propellant 5. The end portion where the aft barrier membrane 10a and the inner barrier membrane 10b meet is joined with a fireproof adhesive over the entire circumference thereof to form a weak portion. This joint is not ruptured during combustion of the first propellant, but is reliably ruptured by operation of the second ignition device 8 or by gas generated by combustion of the second propellant 5.

During combustion of the second propellant 5, the inner barrier membrane 10b, which accounts for the majority of the barrier membrane 10, deforms towards the center and is maintained towards the front portion of the pressure vessel where flow generated by combustion gas of the second propellant 5 is comparatively gentle. In addition, the rupturing portion of the aft barrier membrane 10a deforms so as to be turned towards the rear along the flow of combustion gas. Thus, in addition to the aforementioned effects, the effect is obtained by which rupturability and retainability of the barrier membrane 10 (aft barrier membrane 10a and inner barrier membrane 10b) are distinct and definite.

In addition, the second ignition device 8 is provided close to the joint of the barrier membrane 10 (aft barrier membrane 10a and inner barrier membrane 10b) on the rear end of the second propellant 5, thereby further enhancing the reliability of rupturing of the barrier membrane 10 (aft barrier membrane 10a and inner barrier membrane 10b).

Furthermore, in the case of a two-pulse rocket motor of the form described above, since the second ignition device 8 has a structure that is isolated from a first ignition device 6 by the barrier membrane 10, the strength of the ignition devices can be ensured with respect to environmental factors such as vibrations encountered during operation without causing an increase in structural weight by strengthening the structure of the ignition devices even in the case of a long motor.

PRIOR ART DOCUMENTS

Patent Documents

[Patent Document 1] Japanese Patent No. 3231778
[Patent Document 2] Japanese Patent No. 4179157
[Patent Document 3] Japanese Patent No. 4719182

SUMMARY OF THE INVENTION

Problems to be Solved by the Invention

An ignition device for a two-pulse rocket motor is preferably arranged at a location near the weak portion of the barrier membrane in order to enhance reliability of the barrier membrane rupturing. In this case, however, the ignition device is required to be fixed to an arbitrary member within the combustion chamber and not on a structural member in the manner of the end plate of the rocket motor, and the structure of such an ignition device is not known.

An object of the present invention is to provide an ignition device having a simple structure that is able to be installed on a rear end of a second propellant in a two-pulse rocket motor.

Means for Solving the Problems

The following provides an explanation of means for solving the problems by using reference numbers and reference symbols used in the section describing the best mode for carrying out the invention. These reference numbers and reference symbols are indicated in parentheses in order to clarify the correlation between the description of the claims and the best mode for carrying out the present invention. However, these reference numbers and reference symbols are not intended to be used to interpret the technical scope of the present invention described in the claims.

The present invention, in one aspect thereof, provides an ignition device for a two-pulse rocket motor. The two-pulse rocket motor is provided with a pressure vessel (1), a first propellant (4) placed within the pressure vessel (1) that burns during a first pulse stage, a second propellant (5) placed within the pressure vessel (1) that burns during a second pulse stage following the first pulse stage, and a barrier membrane (10) placed so as to cover the entire initial burning surface of the second propellant (5), wherein the barrier membrane (10) is provided with an inner barrier membrane (10b) that covers the inner peripheral surface of the second propellant (5) and an aft barrier membrane (10a) that covers the rear surface of the second propellant (5), and an end portion where the aft barrier membrane (10a) and the inner barrier membrane (10b) meet is joined over the entire circumference thereof.

The ignition device for a two-pulse rocket motor according to the present invention is provided with an energy supply unit (100), an energy transfer unit (110) connected at one end to the energy supply unit (100), and an ignition unit (120) connected to the other hand of the energy transfer unit (110), the ignition unit (120) is fixed to the aft barrier membrane (10a), and the second propellant (5) is ignited and the barrier membrane (10) (aft barrier membrane (10a) and inner barrier membrane (10b)) is ruptured by operation of the energy supply unit (100), the energy transfer unit (110) and the ignition unit (120).

In the ignition device for a two-pulse rocket motor, the ignition unit (120) may be provided with a booster charge (120-1) connected to the energy transfer unit (110), a main charge (120-2) places around the periphery of the booster charge (120-1), and a sheet-like molded material (120-3) that fixes the booster charge (120-1) and the main charge (120-2) to the aft barrier membrane (10a).

In the ignition device for a two-pulse rocket motor, the main charge (120-2) may be a boron potassium nitrate based pelletized explosive.

In the ignition device for a two-pulse rocket motor, the booster charge (120-1) may be black powder or boron potassium nitrate base powdered explosive contained in a case.

In the ignition device for a two-pulse rocket motor, the sheet-like molded material (120-3) may be a flexible, non-scattering and completely burnable material such as a cured polymer such as hydroxyl-terminated polybutadiene (HTPB), sponge or adhesive.

In the ignition device for a two-pulse rocket motor, the energy transfer unit (110) may be an optical fiber, shock tube detonator or lead tube.

In the ignition device for a two-pulse rocket motor, the energy supply unit (100) may be an optical energy generating device such as a laser diode or a pyrotechnic energy generation device such as an initiator.

Effects of the Invention

According to the present invention, an ignition device able to be installed on the rear end surface of a second propellant can be realized with a simple structure in a two-pulse rocket motor.

EMBODIMENTS FOR CARRYING OUT THE INVENTION

The following provides an explanation of an embodiment of the present invention with reference to the attached drawings.

The ignition device for a two-pulse rocket motor according to an embodiment of the present invention is an ignition device for igniting a second propellant that burns during a second pulse stage following a first pulse stage and ruptures a barrier membrane covering the entire initial burning surface of the second propellant in a two-pulse rocket motor. This ignition device for a two-pulse rocket motor (see FIG. 1) can be applied to, for example, the two-pulse rocket motor described in Patent Document 3.

Figure 1:
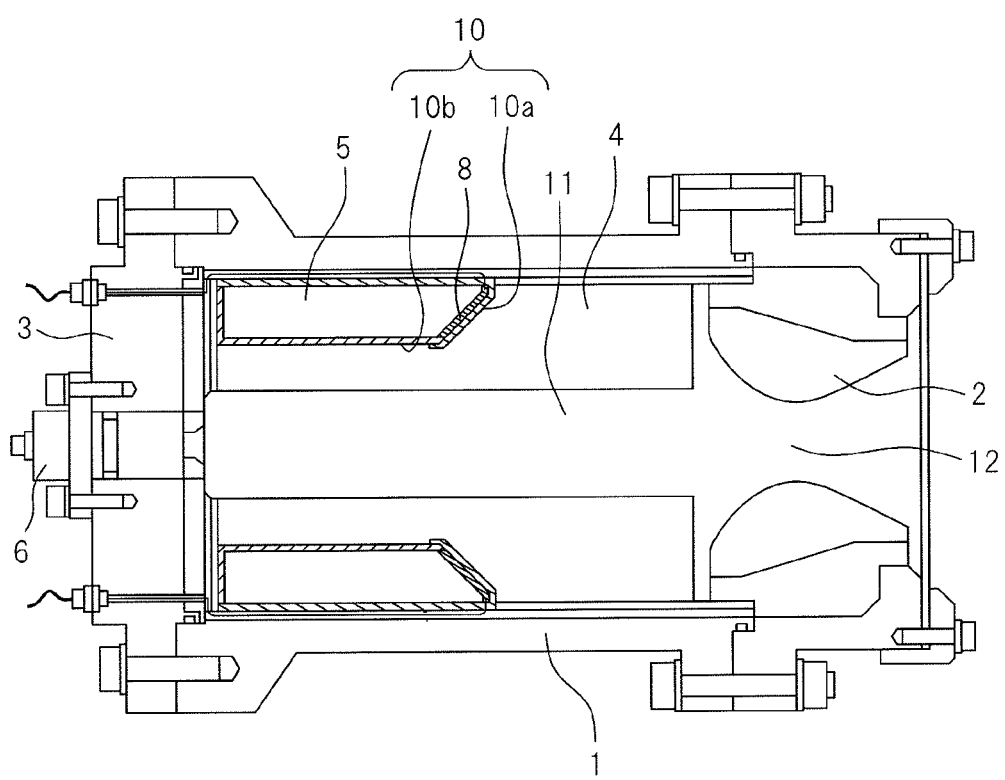
FIG. 1 is a longitudinal cross-sectional view showing one example of a two-pulse rocket motor described in Japanese Patent No. 4719182.

The following provides an explanation of an ignition device for a two-pulse rocket motor according to the present embodiment based on the two-pulse rocket motor indicated as an example in FIG. 1. The same reference symbols are used to indicate those constituents that are the same as the constituents shown in FIG. 1, and duplicate explanations thereof are suitably omitted. Furthermore, the ignition device for a two-pulse rocket motor according to the present embodiment can be similarly applied in other cases as well.

Figure 2:
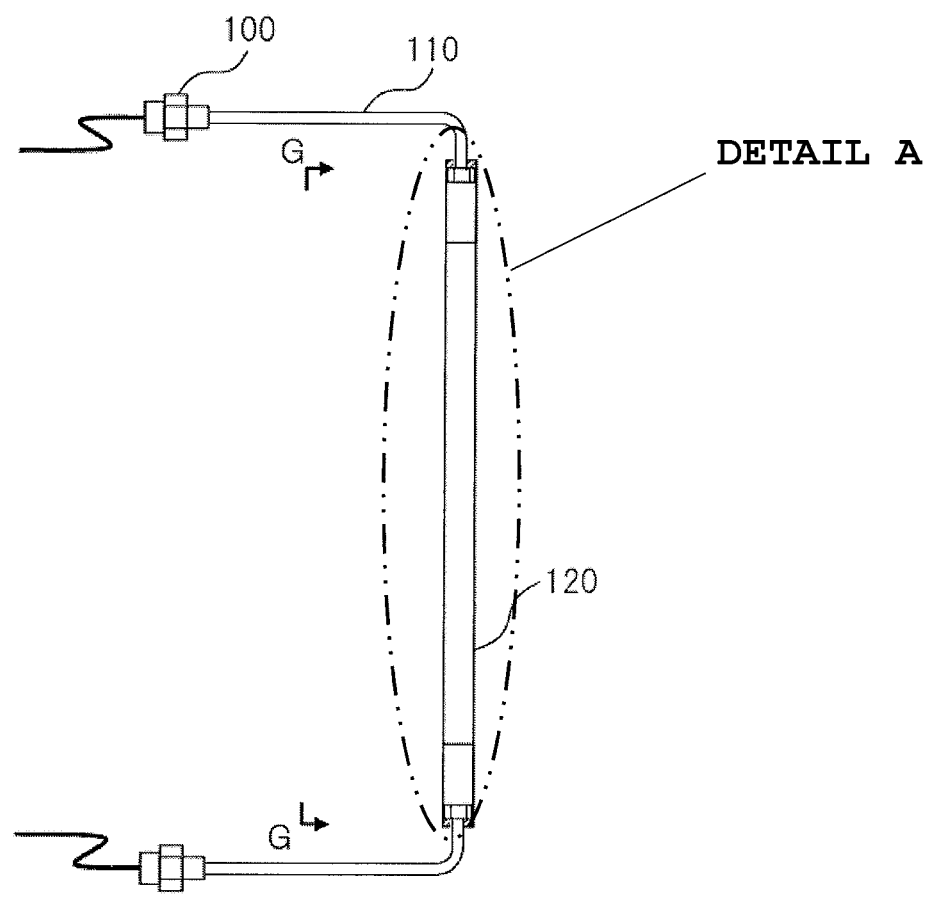
FIG. 2 is a longitudinal cross-sectional view showing an ignition device for a two-pulse rocket motor according to an embodiment of the present invention.
Figure 3:
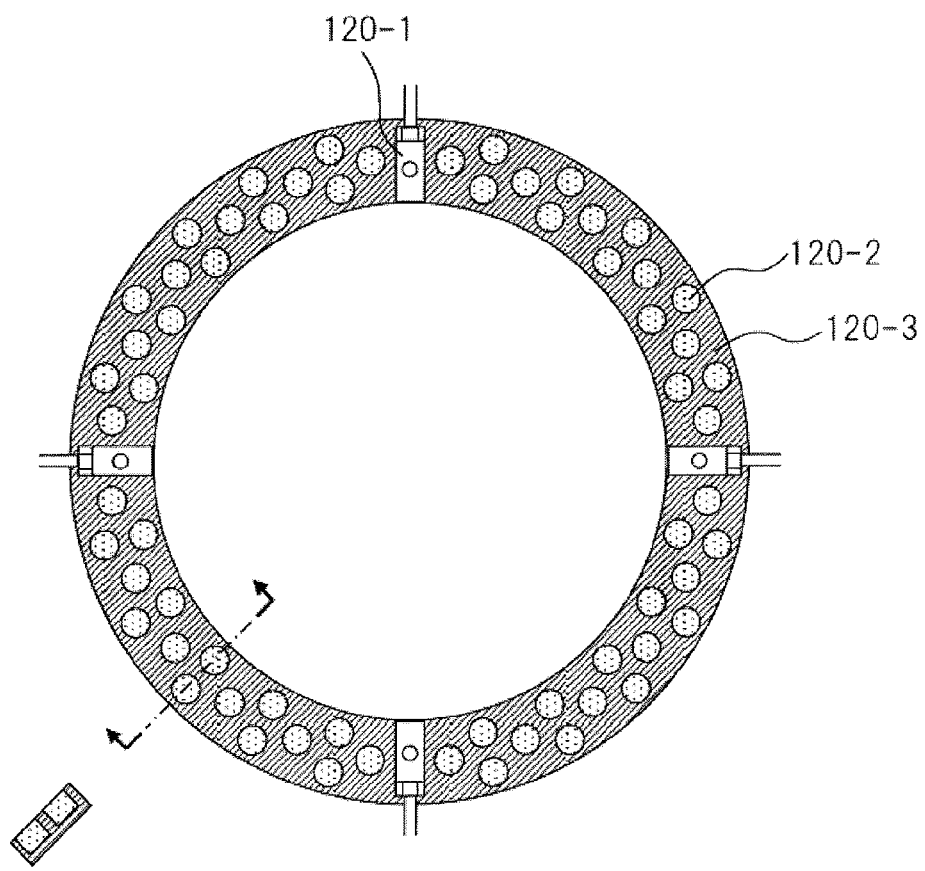
FIG. 3 is a detail view "A" of an ignition unit of the ignition device in accordance with the embodiment of FIG. 2 taken from arrows G-G in FIG. 2.

FIG. 2 shows an example of the structure of the ignition device for a two-pulse rocket motor according to the present embodiment. FIG. 3 is a view taken from arrows G-G in FIG. 2. The ignition device for a two-pulse rocket motor shown in FIG. 2 indicates an example of the structure of the second ignition device 8 in the two-pulse rocket motor shown in the aforementioned FIG. 1.

As shown in FIG. 2, the ignition device for a two-pulse rocket motor is provided with an energy supply unit 100, an energy transfer unit 110 connected at one end to the energy supply unit 100, and an ignition unit 120 connected to the other end of the energy transfer unit 110, the ignition unit 120 is fixed to the aft barrier membrane 10a, the energy supply unit 100 generates energy according to a signal from outside a pressure vessel 1, and the second propellant 5 is ignited and the barrier membrane 10 (aft barrier membrane 10a and inner barrier membrane 10b) is ruptured by operation of the ignition unit 120 through the energy transfer unit 110.

As shown in FIG. 3, the ignition unit 120 may be provided with an booster charge 120-1 connected to the energy transfer unit 110, a main charge 120-2 placed around the periphery of the booster charge 120-1, and a sheet-like molded material 120-3 that fixes the booster charge 120-1 and the main charge 120-2 to the aft barrier membrane 10a.

The main charge 120-2 may be a boron potassium nitrate based pelletized explosive. The use of a pelletized explosive makes it possible to easily control the flow rate and duration of generation of combustion gas according to the quantity and dimension of the pellets in order to impart the required quantity of heat to the second propellant 5.

The booster charge 120-1 may be black powder or a boron potassium nitrate based powdered explosive contained in a case. Furthermore, the case is preferably composed of a completely burnable material such as plastic or nylon, and the container is preferably burned out during combustion of the second propellant 5.

The sheet-like molded material 120-3 may be a flexible, non-scattering and completely burnable material such as a cured polymer such as hydroxyl-terminated polybutadiene (HTPB), sponge or adhesive. By embedding the booster charge 120-1 and the main charge 120-2 in the sheet-like molded material 120-3, the main charge 120-2 can be fixed to the aft barrier membrane 10a made of rubber, for example, and can be made to have a lightweight and simple structure. In addition, by making the sheet-like molded material 120-3 to be made of a flexible, non-scattering and completely burnable material, the main charge 120-2 is not only able to withstand environmental loads such as deformation of the aft barrier membrane 10a and vibrations encountered during operation, but since it is also burned out during combustion of the second propellant 5 without generating solid fragments and other contaminants, protection from heat to prevent it from separation is not required.

The energy transfer unit 110 may be an optical fiber, shock tube detonator or lead tube.

The energy supply unit 100 may be an optical energy generating device such as a laser diode or a pyrotechnic energy generation device such as an initiator. In either case, a compact, lightweight structure is preferable to enable installation in a rocket motor.

As has been explained above, according to the present embodiment, since the main charge 120 can be fixed to the aft barrier membrane 10a in the two-pulse rocket motor shown in FIG. 1, the reliability of rupturing of the barrier membrane 10 (aft barrier membrane 10a and inner barrier membrane 10b) can be further enhanced.

In addition, according to the present embodiment, since the main charge 120 is structurally isolated from the first ignition device 6 by the barrier membrane 10, it is able to withstand environmental factors such as vibrations encountered during operation of the flying object or heat during combustion of the first propellant 4 without causing an increase in structural weight by strengthening the structure of the ignition device even in the case of a long motor.

Furthermore, the inventor of the present invention fabricated a prototype of the ignition device for a two-pulse rocket motor according to the present embodiment, incorporated it in a two-pulse rocket motor based on the configuration shown in FIG. 1, and applied the environmental loads (temperature cycle and vibrations) encountered during operation of the flying object, and then fired the two-pulse rocket motor. As a result, the ignition device for a two-pulse rocket motor according to the present embodiment was confirmed to be free from abnormalities in X-ray inspections carried out following the application of environmental loads, and then operate normally after withstanding environmental load such as heat during combustion of the first propellant 4 and the two-pulse rocket motor was confirmed to generate two stages of thrust (pulses) as prescribed, thereby making it possible to verify the effects of the invention.

The above has provided an explanation of an embodiment of the present invention with reference to the attached drawings. However, the present invention is not limited to the aforementioned embodiment, and can be suitably modified by a person with ordinary skill in the art without deviating from the gist thereof.

BRIEF DESCRIPTION OF THE REFERENCE SYMBOLS

1 Pressure vessel
2 Nozzle
3 End plate
4 First propellant
5 Second propellant
6 First ignition device
8 Second ignition device
10 Barrier membrane
10a Aft barrier membrane
10b Inner barrier membrane
11 Combustion region
12 Ejection port
100 Energy supply unit
110 Energy transfer unit
120 Ignition unit
120-1 Booster charge
120-2 Main charge
120-3 Sheet-like molded material

The invention claimed is:

1. An ignition device in a two-pulse rocket motor, wherein the two-pulse rocket motor comprises:
   a pressure vessel,
   a first propellant that is placed within the pressure vessel and burns during a first pulse stage,
   a second propellant that is placed within the pressure vessel and burns during a second pulse stage following the first pulse stage, and
   a barrier membrane placed so as to cover an entire initial burning surface of the second propellant, wherein the barrier membrane is provided with an inner barrier membrane that covers an inner peripheral surface of the second propellant and an aft barrier membrane that covers a rear surface of the second propellant, and an end portion where the aft barrier membrane and the inner barrier membrane meet is joined over the entire circumference thereof; said ignition device comprising:
   an energy supply unit,
   an energy transfer unit connected at one end to the energy supply unit, and
   an ignition unit connected to other end of the energy transfer unit, wherein the ignition unit is fixed to the aft barrier membrane, and the second propellant is ignited and the barrier membrane is ruptured by operation of the energy supply unit, the energy transfer unit and the ignition unit, and wherein the ignition unit is provided with:
   a booster charge connected to the energy transfer unit,
   a main charge placed around the periphery of the booster charge, and a
   sheet-like molded material that fixes the booster charge and the main charge to the aft barrier membrane.

2. The ignition device for a two-pulse rocket motor according to claim 1, wherein the main charge is a boron potassium nitrate based pelletized explosive.

3. The ignition device for a two-pulse rocket motor according to claim 2, wherein the energy transfer unit is an optical fiber, shock tube detonator or lead tube.

4. The ignition device for a two-pulse rocket motor according to claim 2, wherein the energy supply unit is an optical energy generating device that includes a laser diode or a pyrotechnic energy generation device that includes an initiator.

5. The ignition device for a two-pulse rocket motor according to claim 1, wherein the booster charge is black powder or boron potassium nitrate based powdered explosive contained in a case.

6. The ignition device for a two-pulse rocket motor according to claim 5, wherein the energy transfer unit is an optical fiber, shock tube detonator or lead tube.

7. The ignition device for a two-pulse rocket motor according to claim 5, wherein the energy supply unit is an optical energy generating device that includes a laser diode or a pyrotechnic energy generation device that includes an initiator.

8. The ignition device for a two-pulse rocket motor according to claim 1, wherein the sheet-like molded material is a flexible, non-scattering and completely burnable material such as a cured polymer that includes hydroxyl-terminated polybutadiene (HTPB), sponge or adhesive.

9. The ignition device for a two-pulse rocket motor according to claim 8, wherein the energy transfer unit is an optical fiber, shock tube detonator or lead tube.

10. The ignition device for a two-pulse rocket motor according to claim 8, wherein the energy supply unit is an optical energy generating device that includes a laser diode or a pyrotechnic energy generation device that includes an initiator.

11. The ignition device for a two-pulse rocket motor according to claim 1, wherein the energy transfer unit is an optical fiber, shock tube detonator or lead tube.

12. The ignition device for a two-pulse rocket motor according to claim 1, wherein the energy supply unit is an optical energy generating device that includes a laser diode or a pyrotechnic energy generation device that includes an initiator.

\* \* \* \* \*